(12) United States Patent
Wieczorek

(10) Patent No.: US 12,044,645 B2
(45) Date of Patent: Jul. 23, 2024

(54) DISPLAY DEVICE WITH FITTING DETECTION DEVICE AND METHOD FOR OPERATING A FITTING DETECTION, AN EXTERIOR MIRROR AND A MOTOR VEHICLE

(71) Applicant: MOTHERSON INNOVATIONS COMPANY LIMITED, London (GB)

(72) Inventor: Romeo Wieczorek, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 965 days.

(21) Appl. No.: 16/558,532

(22) Filed: Sep. 3, 2019

(65) Prior Publication Data

US 2020/0103361 A1 Apr. 2, 2020

(30) Foreign Application Priority Data

Sep. 3, 2018 (DE) ...................... 10 2018 121 454.5

(51) Int. Cl.
*G01N 27/22* (2006.01)
*B60R 1/06* (2006.01)
*B60R 1/12* (2006.01)
*B60S 1/08* (2006.01)
*H05B 3/84* (2006.01)

(52) U.S. Cl.
CPC ......... *G01N 27/223* (2013.01); *B60R 1/0602* (2013.01); *B60R 1/12* (2013.01); *B60S 1/0862* (2013.01); *H05B 3/845* (2013.01); *B60R 2001/1215* (2013.01)

(58) Field of Classification Search
CPC .... G01N 27/223; H05B 3/845; B60R 1/0602; B60R 1/12; B60R 2001/1215; B60S 1/0862; B60S 1/0833; B60S 1/0844; G01J 5/0801; G01J 1/10; B60Q 1/2665
USPC .......................................................... 359/507
See application file for complete search history.

(56) References Cited

U.S. PATENT DOCUMENTS

| | | | | |
|---|---|---|---|---|
| 5,703,568 A | * | 12/1997 | Hegyi | ................... B60S 1/0818 340/602 |
| 7,926,960 B2 | * | 4/2011 | Skiver | .................... B60R 11/02 359/603 |
| 2004/0008410 A1 | * | 1/2004 | Stam | ........................ G02B 1/11 359/443 |

(Continued)

FOREIGN PATENT DOCUMENTS

| | | |
|---|---|---|
| DE | 10 2011 008 556 | 7/1912 |
| DE | 3790327 T1 | 6/1989 |

(Continued)

OTHER PUBLICATIONS

Office action dated Jul. 23, 2019 of the German application No. 10 2018 121 454.5.

(Continued)

*Primary Examiner* — Ricky D Shafer
(74) *Attorney, Agent, or Firm* — Jones Day

(57) ABSTRACT

A display device, particularly for an exterior mirror of a motor vehicle, comprising a display means that comprises a lighting means, characterized in that the display device comprises a moisture detection apparatus comprising a sensor device, the moisture detection apparatus being designed to at least partially detect light emitted by the display means and light reflected by moisture.

26 Claims, 3 Drawing Sheets

(56) References Cited

U.S. PATENT DOCUMENTS

| | | | |
|---|---|---|---|
| 2011/0168687 A1 | 7/2011 | Door et al. | |
| 2012/0229882 A1* | 9/2012 | Fish, Jr. ................. | B60R 1/088 |
| | | | 359/267 |
| 2013/0128333 A1* | 5/2013 | Agrawal ................ | G02F 1/161 |
| | | | 359/267 |
| 2014/0029005 A1* | 1/2014 | Fiess ..................... | G01N 21/94 |
| | | | 356/364 |
| 2014/0211492 A1* | 7/2014 | Neuman ............. | B60Q 1/2665 |
| | | | 362/494 |
| 2015/0142263 A1 | 5/2015 | Hirai et al. | |
| 2018/0272946 A1* | 9/2018 | Worthen .................. | B60R 1/06 |

FOREIGN PATENT DOCUMENTS

| | | |
|---|---|---|
| EP | 0919443 A2 | 6/1999 |
| WO | WO 2001/31319 A1 | 5/2001 |

OTHER PUBLICATIONS

Office action dated Nov. 28, 2023 of the German application No. 10 2018 121 454.5.

\* cited by examiner

DISPLAY DEVICE WITH FITTING DETECTION DEVICE AND METHOD FOR OPERATING A FITTING DETECTION, AN EXTERIOR MIRROR AND A MOTOR VEHICLE

CROSS-REFERENCE TO RELATED APPLICATION

This application claims the benefit of foreign priority to German Patent Application No. 10 2018 121 454.5, filed Sep. 3, 2019, which is hereby incorporated by reference in its entirety for all purposes.

BACKGROUND

The invention relates to a display device comprising at least one display means for moisture detection that comprises at least one lighting means for irradiating at least one element, a method for operating such a device, an exterior mirror with such a device, and a motor vehicle with such an exterior mirror, or for carrying out said method.

In modern motor vehicles, an increasing number of electronic (digital) display surfaces are being used, particularly in conjunction with (optical) measuring and assistance systems which, on the one hand, can replace the classical analog instrumentation of the motor vehicle and, on the other hand, can provide additional information and support the control and monitoring of various vehicle systems, particularly based on environmental conditions and the state of the vehicle occupants.

It has been found that these elements, such as display surfaces and systems, are susceptible to soiling and weather-related moisture such as dew and ice when used on the exterior of the motor vehicle or at very low temperatures, high humidity, and/or a combination of these environmental conditions.

For this reason, it is desirable that moisture detection and cleaning be performed in order ensure the functioning of the display surfaces and systems and/or usability for a user. A detector system for detecting moisture is known from WO 01/31319 A1, for example.

WO 01/31319 A1 describes a detector system consisting of a sensor and at least one light source and is preferably attached to the rear window of a motor vehicle. The light source illuminates at least a portion of this window pane, and increased reflection of the light of the light source that occurs as a result of soiling, icing, and rain is registered in the sensor. Different light sources can emit different wavelengths, and the light sources can be operated with different intensities, polarizations, and/or different pulse durations. Temporal evaluation of the signals makes it possible to distinguish between different sources of contamination.

Furthermore, display devices of this generic type are known from the prior art, for example in the form of a blind spot indicator from U.S. Pat. No. 7,581,859 B2.

In these systems, however, the detection of moisture is associated with increased design complexity and energy consumption, particularly as a result of an additional detector system, as described in WO 01/31319 A1. The increased energy consumption is particularly undesirable and problematic in electric vehicles, as it significantly reduces the range of the vehicle.

SUMMARY

It is therefore the object of the present invention to provide a moisture detection system that overcomes the disadvantages of the prior art. In particular, the simplest, most cost-effective, and smallest device for detecting moisture is to be provided in which the detection of moisture is facilitated by an integrated system, the number of parts required and the installation space are reduced, and less energy is consumed, thus enabling the efficiency of the motor vehicle to be increased and production costs reduced.

This object is achieved by a device having the features of claim 1, a method having the features of claim 11, an exterior mirror having the features of claim 14, and a motor vehicle having the features of claim 21. Preferred devices according to the invention are described in claims 2 to 10, and preferred exterior mirrors according to the invention are described in claims 15 to 20.

The object is achieved by the invention according to a first aspect in that the display device comprises at least one moisture detection apparatus comprising at least one sensor device, the moisture detection apparatus being designed to at least partially detect light emitted by the display means and light reflected by moisture that is present on at least a portion of the element. The term "reflected light" also includes a diffuse reflection here. The element is at least partially transparent at least in some areas, at least for light of a certain wavelength.

It is especially advantageous that the display means is capable of assuming at least one light-emitting function, the display means being capable, in particular, of taking over the displaying of at least one signal from a blind spot assist system, a travel direction indicator, a puddle light, or a camera system, particularly a TOF camera system, a status indicator, such as during autonomous driving, for example, a battery status indicator, a logo lamp, preferably on the element, and/or the light lies in the visible, invisible, and/or infrared spectral range, and/or the element comprises, at least in part, a particularly chromium-coated reflecting surface.

It is especially preferred that the lighting means comprise at least one light source, the lighting means advantageously comprising an active or passive light source and/or a plurality of distributed light sources which, in particular, are distributed over a display region and/or in the manner of a matrix.

A provision can also be made that at least one light source comprises groups of emitters and/or regions with different spectral emission ranges, in which case, particularly for a region that is illuminated by a background light source, the spectral composition of the light emitted from the region is determined at a region that is partially absorbing the light of the background source as a result of the absorption of the partially absorbing region, and/or, for a region that is absorbing the light of the background light source, the light emitted from the region can have a spectrum that differs at least in portions from the absorbed light of the background light source by means of re-emission from the region; and/or that are operated at different intensities, polarizations, and/or different pulse durations and/or can emit in different spectral ranges.

It is also preferred in this respect that the moisture detection apparatus be able to detect a portion of a spectrum that the display means does not emit.

With the invention, it is also proposed that the display device comprise at least one dark chamber that is separated substantially almost completely from the display means in which the moisture detection apparatus is preferably housed at least partially, particularly completely. A differential measurement can be performed in order to calculate the proportion of outside light that enters the dark chamber from the outside through the cover and through any potential moisture: At a first timepoint, the sum of outside light and the light reflected by the moisture is measured and, at a second timepoint, only the outside light is measured by the moisture detection apparatus in the dark chamber. By finding the difference between the two measurement signals, the contribution of the outside light is subtracted, and the result is a measurement signal that is based on the reflected light without the influence of the outside light. In principle, this differential method can also be applied to other embodiments without the use of the dark chamber. In another embodiment, the dark chamber comprises at least one filter that is only partially transparent to at least a portion of the light emitted by the display means by means of which the spectrum of the light that is incident on the moisture detection apparatus can be adjusted, that can at least partially reflect and/or absorb light of at least a first polarization and light of at least a second polarization that differs substantially from the first polarization, and/or by means of which incident light from the outside can be attenuated and/or filtered out; or the moisture detection apparatus detects only a specific spectrum, particularly a spectrum in the infrared range. In another embodiment, the dark chamber is protected at least partially from the light that is incident from the outside by a layer that is not completely transparent, preferably not transparent, at least with respect to the light that incident from the outside.

It is advantageously possible for the display device to comprise at least one capacitive sensor element that is designed to detect moisture, the capacitive sensor element preferably comprising at least two electrodes and/or being formed at least in part by existing components, particularly components of the display device and/or display means.

It is especially preferred, in turn, that the display device comprise at least one control device and/or at least one computer unit, the control device being preferably designed to be operatively connected to and/or to actuate and/or control at least one device for removing moisture, particularly the heating device, cleaning device, and/or vibration device, display device, particularly the display means and/or moisture detection apparatus, and/or the capacitive sensor element, and/or being integrated at least partially into the moisture detection apparatus or the display means, and/or evaluating data supplied to the control device and/or computer unit and forwarding it to the control device and/or other devices.

A method can also be provided that is characterized by the execution of the steps of activation of the display means, measurement, and moisture detection, wherein the step of the activation of the display means preferably comprises operation of the display means at different intensities, different polarizations, different pulse durations, and/or different spectral ranges, wherein the step of measurement is carried out multiple times, and wherein the step of moisture detection comprises the analysis of different emissions and detections, particularly for the purpose of distinguishing different forms of moisture and/or of improving the detection of moisture; during the step of moisture detection, the value that was measured and/or further processed during the step of measurement is compared to a reference value, particularly a reference value that has been established by the manufacturer, calibrated in the plant after manufacturing, or generated by other means, and/or, after the step of moisture detection, the heating device, the means for removing moisture, and/or a warning function is activated as needed.

It can also be especially preferred, in turn, that the element, particularly the cover, be at least partially transparent, preferably substantially completely transparent, to emitted light of certain wavelengths of a spectrum emitted by the display device and comprise at least one outer surface that is positioned on the side facing away from the interior of the exterior mirror and is exposed to the outside influences of the environment; the coating be applied on the side of the cover facing away from the outer surface, it being possible for the coating to be interrupted and/or lessened in order to at least partially transmit the light of the display device; and the exterior mirror comprise at least one heating device, particularly comprising at least one heating coil, at least one coating and/or at least one heating foil, at least one cleaning device, particularly comprising at least one brush, at least one wiper, and/or at least one nozzle, and/or at least one vibrating device, particularly at least one motor, at least one piezoelectric actuator, and/or at least one sound source, particularly at least one ultrasound source.

Furthermore, it can be advantageous that the element, in particular the cover, comprise at least one symbol region for displaying a display signal from the display device, at least one EC glass, at least one display, and/or at least a portion of an EC glass or of a display.

As an embodiment, the invention further proposes that the coating comprise at least one reflective coating, in particular at least one chromium coating, at least one coating that is absorbent for at least for a specific spectral range, at least one antireflection coating, at least one transmitting coating, and/or at least one coating that is electrically conductive and advantageously transparent at least for a specific spectral range, in particular a coating comprising transparent, electrically conductive oxides such as indium-tin oxide, carbon nanotubes, and/or electrically conductive polymers.

And it can also be especially preferred that at least a portion of the electrically conductive coating form at least a portion of at least one capacitive sensor element and/or function as a heating device.

According to the invention, it can also be preferred that the exterior mirror comprise more than one display device, and that the display devices, in particular the light and measurement signals of a plurality of display devices, be operatively connected to one another for the purpose of detecting moisture.

Here again, a provision can be made that the exterior mirror comprises at least one capacitive sensor element that is designed to detect moisture, particularly by measuring a dielectric constant of a dielectric, comprising at least a portion of the element, preferably of the cover, particularly a portion of the outer surface of the element, as well as moisture located on the at least one portion of the element, the capacitive sensor element preferably comprising at least two electrodes and/or being formed at least in part by existing components, particularly by components of the display device, the display means, and/or the exterior mirror.

It is likewise advantageously possible for the exterior mirror to comprise at least one control device and/or at least one computer unit, in which case the control device is preferably designed to be operatively connected to and/or to actuate and/or control at least one device for removing moisture, particularly heating device, cleaning device, and/or vibration device, at least one display device, particularly the display means, and/or moisture detection apparatus, and/or at least one capacitive sensor element, and evaluates data supplied to the control device and/or computer unit and forwards it to the control device and/or other devices.

It can also be preferred that the motor vehicle, particularly self-driving motor vehicle, be designed with a display device according to any one of claims 1 to 8 and/or an exterior mirror according to any one of claims 10 to 16 and/or for carrying out a method according to claim 9.

For the purposes of the present invention, the term "moisture" encompasses any form of surface fouling formed by temperature and/or atmospheric composition, in particular by precipitation, that deposits on objects, for example through condensation and/or resublimation, and/or, particularly in solid form, settles and/or accumulates on objects and can be released by changes in temperature. Forms of such moisture include ice, snow, dew (fog), rime, and frost, for example. However, the term "moisture" also includes dirt and other contaminants that can settle and/or accumulate on surfaces and can be removed by means of a cleaning device comprising a wiper, a brush, and/or a nozzle, for example, and/or by means of a vibrating device comprising a motor, a piezoelectric actuator, and/or a sound source, particularly an ultrasound source, for example.

For the purposes of the present invention, the term "light" encompasses not only the visible and infrared spectrum, but also any form of wave, in particular electromagnetic waves and/or sound waves, that the display means emit and that can be reflected by moisture. Here, the term "reflect" also includes scattering, refracting, bending, and/or absorbing and re-emitting the waves so that they can be received by an appropriately positioned detector.

In addition to the conventional exterior mirror, "exterior mirrors" also include any form of exterior mirror system used in motor vehicles, particularly in the form of camera-based exterior mirror replacement systems, including with integrated display technologies that are arranged at least partially on the exterior of the motor vehicle.

According to the invention, a method is provided for operating a display device, particularly in an exterior mirror of a motor vehicle, that comprises in particular a display means and a moisture detection apparatus and in which at least the steps of activating a display means comprising at least one moisture detection apparatus and at least one sensor device; and measurement and moisture detection by means of the moisture detection apparatus, which at least partially detects a light emitted by the display means and light reflected by a moisture that is present.

In one embodiment of the method, the method includes the additional steps of measuring a first signal for the sum of outside light and the light reflected by the moisture at a first timepoint; measuring a second signal only for the outside light, with the display means not emitting any light, at a second timepoint; and finding the difference between the two signals, thereby subtracting the contribution of the outside light and providing a differential signal based solely on the light reflected by the moisture without the influence of the outside light. The differential method enables reflected light to be detected even when the moisture detection apparatus is exposed to sunlight from the outside.

In another embodiment of the method, the step of moisture detection comprises the detection of a type of moisture, the type of moisture being identified as water in the case of a high differential signal and as ice in the case of a correspondingly lower differential signal. An exterior mirror according to the invention can be equipped with one or a plurality of display devices that are designed to carry out a method according to the invention of the type described.

A motor vehicle according to the invention can be equipped with one or a plurality of exterior mirrors with one or a plurality of display devices that are designed to carry out a method according to the invention of the type described.

BRIEF DESCRIPTION OF THE DRAWINGS

Preferred embodiments of the present invention will be described in the following by way of example with reference to schematic drawings, in which.

DETAILED DESCRIPTION

Although the embodiments are explained below with reference to an exterior mirror, the underlying invention can also be used in other areas and components.

Figure 1:
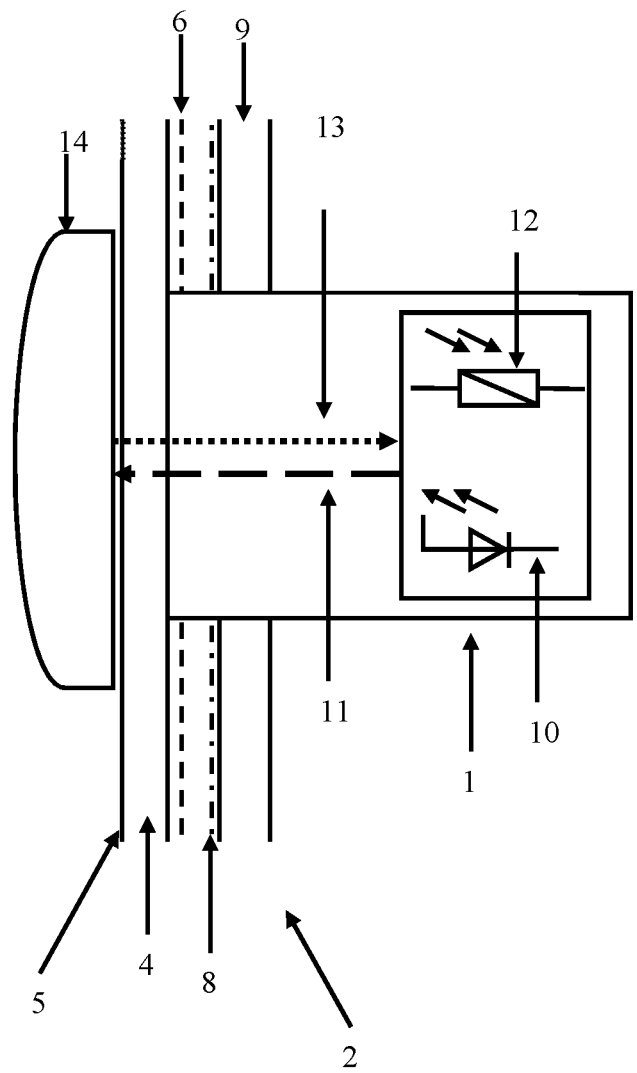
FIG. 1 shows a sectional view of a portion of an exterior mirror of a motor vehicle with a first embodiment of a device according to the invention.

FIG. 1 shows a sectional view of a portion of an exterior mirror of a motor vehicle with a first embodiment of a display device 1 according to the invention. The exterior mirror 2 comprises a cover 4, which represents an element on the outer surface 5 of which moisture can form. Furthermore, the exterior mirror 2 comprises a coating 6, a heating device 8, and a carrier material 9. The cover 4 is at least partially transparent, preferably substantially completely transparent, for emitted light of specific wavelengths of a spectrum that is emitted by the display device 1. In particular, the material of the cover can also include glass, at least in part. An outer surface 5 of the cover 4 is positioned on the side facing away from the interior of the exterior mirror and thus exposed to the external influences of the environment.

The coating 6 is applied to the side facing away from the outer surface 5 of the cover 4 and can be interrupted and/or lessened in order to allow the light of the display device 1 through. In particular, the coating 6 can comprise a reflective coating for a mirror element, e.g., a chromium coating. The coating 6 can also have a coating that is absorbent at least for a specific spectral range, an antireflective coating, a transmitting coating, and/or a coating that is electrically conductive and advantageously transparent for at least one specific spectral range, e.g., a coating of transparent, electrically conductive oxides such as indium tin oxide, carbon nanotubes, and/or electrically conductive polymers. In particular, an electrically conductive coating can also function as a heating device 8.

The heating device 8 is designed such that it can change the temperature of the cover 4 in such a way that a moisture present on the outer surface 5 is dispersed. In particular, the heating device 8 is arranged in substantially laminar fashion beneath the cover 4, for example in the form of a heating coil, a coating, or a heating foil. The heating device 8 is connected to a control device (not shown), particularly to a control device of a motor vehicle that controls the heating device 8.

The display device 1 comprises a display means 10 and a moisture detection apparatus 12. The display means 10 is designed to assume different light-emitting functions, particularly the emission of light in the visible and/or infrared spectral range, e.g., the displaying of a signal from a blind spot assist system, a travel direction indicator, a puddle light, a camera system, particularly a TOF camera system. The display means comprises at least one lighting means. A lighting means is a device for emitting light and thus particularly comprises active light sources, such as incandescent and light-emitting diodes, and passive light sources, such as light conductors or waveguides. It is especially advantageous in this context if the lighting means of the display means provides light sources that are distributed in particular over a display region. In the case of a display means that is based on a particularly matrix-like distribution of light sources, the light sources comprising groups of emitters and/or regions with different spectral emission ranges, spectral emitters for the spectral range of moisture detection can be provided, and/or the existing groups of emitters and/or regions that can provide at least a portion of the spectral range for moisture detection are activated. Such an emitter for a display means can also constitute or comprise an absorbing region in which the spectral composition of the light emitted from the region is determined for a region that is illuminated by a background light source through the partial absorption of the light of the background light source by the partially absorbing region. It is also possible for such an emitter to comprise a re-emission that is triggered by the absorption of light, particularly by the absorption of light from a background light source, in a spectrum that differs at least partially from the absorbed light from the background light source. A combination—and even a stacking—of emitting, absorbing, and re-emitting regions is likewise possible. Light sources can be operated at different intensities, polarizations, and/or different pulse durations and/or emit in different spectral ranges. Through the particularly temporal evaluation of different emissions, it is possible to differentiate different types of moisture and/or to improve the detection of moisture.

The moisture detection apparatus 12 comprises at least one sensor device that is designed to be able to detect at least a portion of the light emitted by the display means 10. The moisture detection apparatus 12 is connected to a control device (not shown). In particular, the control device can also actuate and/or control devices for removing moisture, such as heating devices, cleaning devices, and/or vibration devices, for example. The control device can also be integrated into the moisture detection apparatus 12 or the display means 10, and/or it can also be identical to or connected in particular to a control device of a motor vehicle, particularly to the control device that controls the heating device 8. For the sake of example, the circuit symbols for an LED are shown as the display means and the circuit symbols for a photoresistor are shown as the moisture detection apparatus.

The display device 1 is connected to the exterior mirror 2 in such a way that at least a portion of the light 11 emitted by the display means 10 is allowed to get outside via the cover 4, preferably via a cutout, particularly through the carrier material 9, the heating device 8, and the coating 6. If, as is shown in FIG. 1, moisture 14 is present on the cover 4, a portion of the light 11 emitted by the display means 10 can be reflected on the moisture 14 and detected as a reflected light 13 by the moisture detection apparatus 12. In general, the portion of the light that is reflected on the moisture will increase the total amount of light emitted by the display means 10 and detected by the moisture detection apparatus 12. By selecting the spectrum of the light of the display means 10 for moisture detection, particularly through selection of a spectrum in the non-visible range, through the timing of the activation of the moisture detection apparatus 12 and the display means 10, and/or by tuning the moisture detection apparatus 12 to a portion of the light spectrum emitted by the display means 10 and typically reflected by moisture, the moisture detection can be advantageously improved. A provision can also be made that—particularly in the case that the moisture absorbs a certain portion of the spectrum of the light emitted by the display means 10 and re-emits a spectrum that differs from the absorbing portion of the spectrum—the moisture detection apparatus 12 can detect a portion of a spectrum that the display means 10 is not emitting.

As an alternative or in addition to the heating device 8, a cleaning device (not shown here), particularly comprising a brush, a wiper, and/or a nozzle, can be attached to the outside of the exterior mirror in order to mechanically remove the moisture.

As an alternative or in addition to the heating device 8 and/or the cleaning device, the exterior mirror can comprise a vibration device such as a motor, a piezoelectric actuator, and/or a sound source—particularly an ultrasound source—that can cause the cover 4 and/or the moisture to vibrate. This makes it possible for at least a portion of the moisture to be removed from the surface.

The cover 4 can also comprise an EC glass, a display, and/or a portion of an EC glass or of a display.

Figure 2:
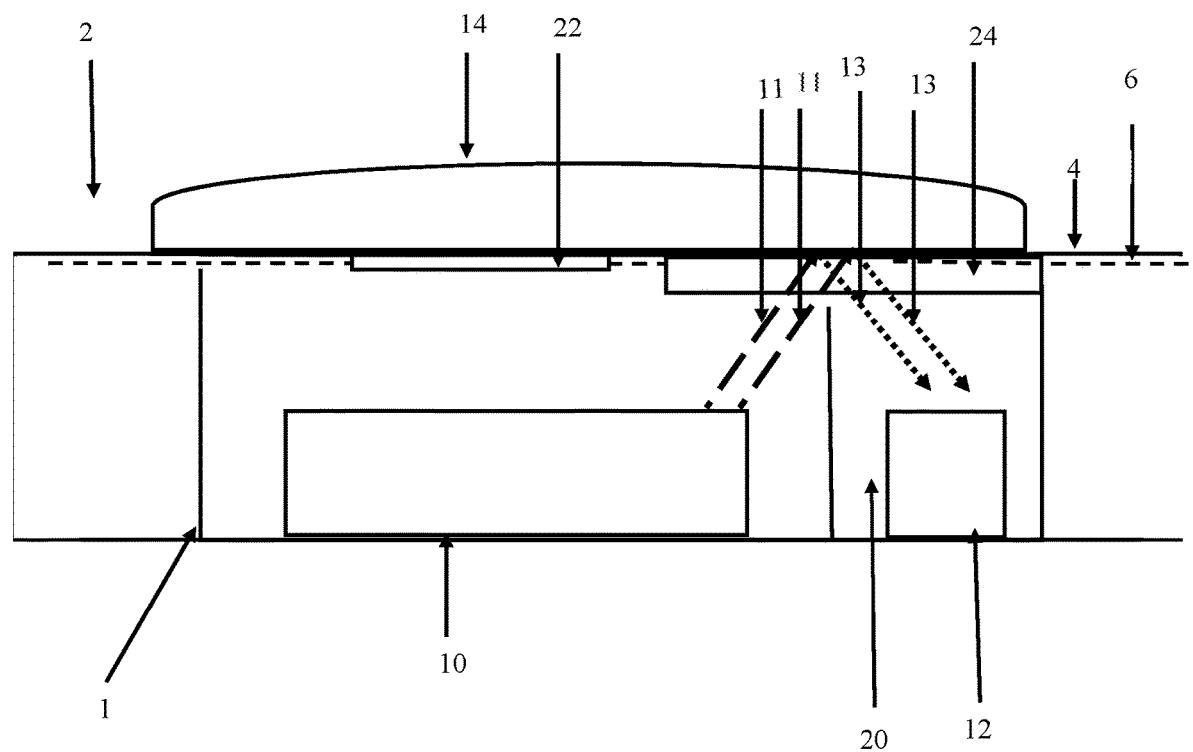
FIG. 2 shows a sectional view of portion of an exterior mirror of a motor vehicle with a second embodiment of a device according to the invention.

FIG. 2 shows a second embodiment of a display device 1 according to the invention as part of an exterior mirror 2 of a motor vehicle. The exterior mirror 2 is substantially the same as in the first embodiment and, for greater clarity, some of the components shown in FIG. 1 are not shown. The exterior mirror 2, particularly the cover 4, comprises a symbol region 22 for displaying a display signal from the display device 1. In the symbol region 22, the coating 6 can be interrupted and/or lessened in order to allow the light of the display device through, in which case the coating 6 is interrupted and/or lessened particularly in the form of a symbol for the display of the display device. The display device 1 comprises a display means 10, particularly in the form of a light source and/or light conductor, as well as a dark chamber 20 that is separated from the display means and in which the moisture detection apparatus 12 is housed. If there is moisture 14 on the outer surface of the cover 4, light 11 emitted by the display means 10 is reflected on the moisture 14 into the dark chamber 20, where the reflected light 13 can be detected by the moisture detection apparatus 12. In this embodiment, the dark chamber 20 is delimited on the side facing toward the outside by a filter 24 and defines a measurement range, the filter being at least partially transparent, in particular substantially completely transparent, for the light 11 that is emitted by the display means 10. The coating 6 can also be interrupted and/or lessened in the vicinity of the filter, particularly if the coating 6 is not substantially permeable for the light 11, but reflective. If there is moisture 14 on the outer surface of the cover 4, light 11 emitted by the display means 10 is reflected on the moisture 14 through the filter 24 into the dark chamber 20, where the reflected light 13 can be detected by the moisture detection apparatus 12. The filter can be used to set the spectrum of the light that is incident on the moisture detection apparatus. In particular, this also makes it possible for light that is incident from the outside to be attenuated and/or filtered out. Advantageously, the filter is an IR filter, and the display device 10 emits light in the non-visible infrared range, inter alia. Functionally speaking, the measurement range could also be operated without a filter 24, particularly even without a coating 6, if the moisture detection apparatus 12 only detects a specific spectrum, particularly a spectrum in the infrared range.

However, the filter 24 can also be configured to transmit light of a first polarization and to reflect and/or absorb light of at least a second polarization that differs from the first. The filter can thus be designed to reflect and/or absorb the light of the display means 10 and be mounted directly over the moisture detection apparatus 12, with the effect that the light emitted by the display means 10 does not pass directly through the filter and does not reach the moisture detection apparatus 12. However, if the light emitted in this way is reflected by an object, particularly a moisture, with a simultaneous change in the polarization, at least a portion of the reflected light is able to pass through the filter and the moisture can be detected by the moisture detection apparatus.

Figure 3:
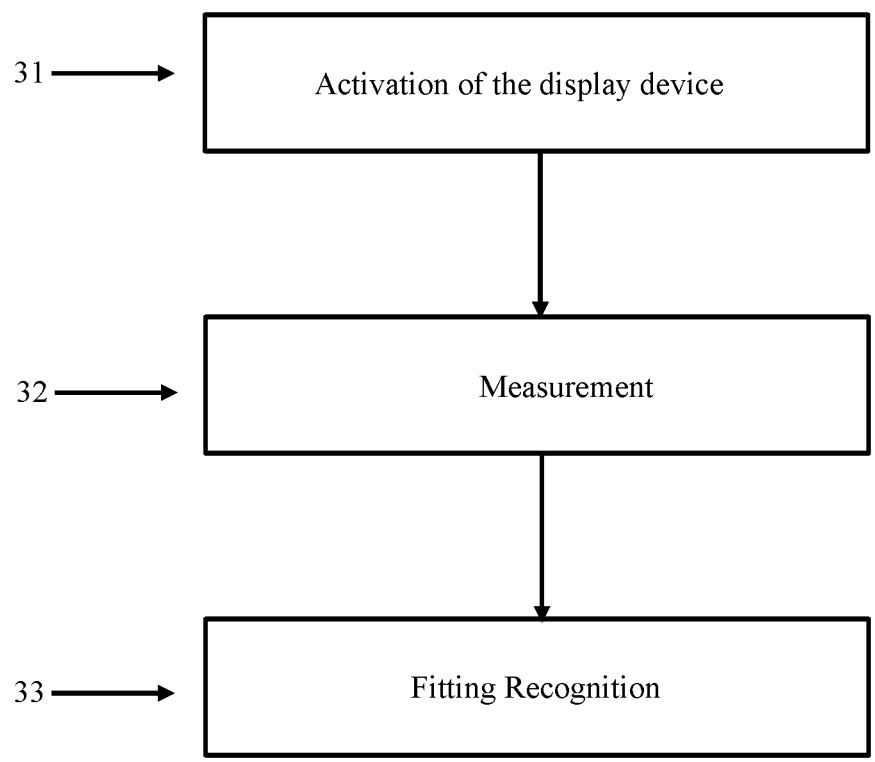
FIG. 3 shows a block diagram of a method according to the invention.

A method according to the invention for detecting moisture is shown schematically in FIG. 3. The method comprises at least the steps of activation of the display means 31, measurement 32, and moisture detection 33, with the heating device, the cleaning device, and/or the vibrating device being activated as needed in order to disperse the moisture. The method can be employed separately for the detection of moisture or even also when the display device is activated for its actual function. Alternatively or in addition, a warning function can be triggered.

During the step of the activation of the display means 31, the display means is activated in order to emit light to the outside. If there is moisture on the cover, a portion of the emitted light can be reflected back.

Alternatively or in addition, the display means can be operated at different intensities, polarizations, and/or different pulse durations and/or emit in different spectral ranges. By selecting the spectral range of the light of the display means for moisture detection, particularly through selection of a spectrum in the non-visible range, through the timing of the activation of the moisture detection apparatus 12 and the display means 10, and/or by tuning the moisture detection apparatus 12 to a portion of the light spectrum emitted by the display means 10 and typically reflected by moisture, the moisture detection can be advantageously improved.

During the step of measurement 32, the moisture detection apparatus and/or a capacitive sensor element that may be present is activated for moisture detection in order to detect the light that is incident on the moisture detection apparatus, particularly to measure the intensity, polarization, wavelength, pulse duration, and/or spectral range of the light that is incident on the moisture detection apparatus and/or to detect moisture based on the measurement of the capacitive sensor element. Through the particularly temporal evaluation of different emissions and detections, it is also possible to differentiate different types of moisture and/or to improve the detection of moisture.

During the step of moisture detection 33, the reflection intensity is calculated; in particular, the value measured or already further processed during the measurement step is compared to a reference value. This reference value can either have been established by the manufacturer, calibrated in the plant after the manufacture of the display device, of the exterior mirror, and/or of the motor vehicle, or generated by other means and/or stored in a memory device. For instance, the step of measuring the intensity can be carried out multiple times in the method in order to obtain additional reference values without an activated display means, particularly before the step of activating the display means. The intensity of the light reflected by moisture can thus be determined particularly through subtraction.

Even when parking, particularly when closing, a motor vehicle comprising an exterior mirror that comprises such a display device according to the invention with moisture detection apparatus, a reference value can be generated through activation of the display means and the moisture detection apparatus and stored which—particularly upon subsequent activation of the display means and/or of the moisture detection apparatus, advantageously upon opening of the motor vehicle—can be used to detect moisture that has formed in the time between the parking of the motor vehicle and the time of moisture detection. A respective reference value without activation of the display means is advantageously also generated and stored for this purpose.

The method is carried out by a control device that is preferably integrated into the display device. However, the control device can also be integrated into the exterior mirror or motor vehicle and connected to the display device via a communication system. In particular, the control device can also actuate and/or control devices for removing moisture, such as heating devices, cleaning devices, and/or vibration devices, for example, as well as display devices, particularly display means and/or moisture detection apparatuses, and capacitive sensor elements. A computer unit can also be provided. The computer unit evaluates the data supplied to it and/or to the control device and then forwards them to the control device and/or other devices. The computer unit can also be a subunit of the control device and/or already be integrated into same. Various evaluation algorithms—particularly subtraction—can be used to evaluate the data.

Advantageously, an exterior mirror is equipped with more than one display device. The use of multiple display devices for moisture detection results in an increased probability of detection, particularly of moisture over a large surface, if a plurality of display devices identify moisture at the same time or in rapid succession.

It is also possible for the moisture to have the effect that the light of one display device is received or no longer received from the moisture detection apparatus of another display device, particularly as a result of total reflection or impeded total reflection. The connection between a plurality of display devices, particularly the light and measurement signals of a plurality of display devices, can thus not only enable moisture to be identified, but particularly also the location, distribution, and extent of moisture to be identified as well.

Advantageously, a display device and/or the exterior mirror can also comprise a capacitive sensor element that is designed to detect moisture, particularly through the measurement of a dielectric constant of a dielectric, comprising at least a portion of the cover, particularly a portion of the outer surface of the cover, as well as moisture located on the cover. In particular, the capacitive sensor element can be instantiated in the form of two electrodes that can form a capacitor together with the dielectric. When moisture is present, particularly in the form of a polar liquid such as water, for example, the dielectric constant of the capacitor changes measurably. In particular, the capacitive sensor element can also be formed at least in part by already existing components, particularly by components of the display device and/or display means. As a specific example, a heating device—e.g., two electrically unconnected or separable heating electrodes of a heating device of an exterior mirror—can act as a capacitive sensor. It is also possible for portions of an electrically conductive coating to act at least as part of a capacitive sensor element.

The features of the invention that are disclosed in the foregoing description, in the drawings, and in the claims can be essential both individually and in any combination for the implementation of the invention in its various embodiments.

LIST OF REFERENCE NUMBERS

1 display device
2 exterior mirror 4 element, e.g., a cover
5 outer surface
6 coating
8 heating device
9 carrier material
10 display means
11 emitted light
12 moisture detection apparatus
13 reflected light
14 moisture
20 dark chamber
22 symbol region
24 filter
31, 32, 33 method step

What is claimed is:

1. A display device for an exterior mirror of a motor vehicle, comprising
    at least one display means, the at least one display means being (i) operable in a normal operation to generate a display signal that is viewable in a symbol region of the exterior mirror to provide information to a driver, and (ii) operable to emit light for use in detecting moisture on the display device,
    the at least one display means comprising at least one lighting means for irradiating at least one element that is at least partially transparent at least for light of a specific wavelength; and
    at least one moisture detection apparatus comprising at least one sensor device, the at least one moisture detection apparatus being configured to at least partially detect light emitted by the at least one display means and light absorbed and partially reflected by moisture that is present on at least a portion of the at least one element, wherein the at least one lighting means is configured to emit light having a wavelength spectrum comprising a plurality of wavelengths, wherein the moisture absorbs light having a wavelength within a first portion of the wavelength spectrum and reemits light having a wavelength within a second portion of the wavelength spectrum, the second portion differing from the first portion; and
    wherein the at least one moisture detection apparatus is configured to detect a presence of the moisture based on a difference between the first portion and the second portion of the wavelength spectrum.

2. The display device of claim 1, wherein at least one of
    the display means is capable of at least one light-emitting function,
    the display means is capable of taking over the displaying of at least one signal from at least one of a blind spot assist system, a travel direction indicator, a puddle light, a camera system, a TOF camera system, a status indicator, a battery status indicator, or a logo lamp, on the element, or
    at least one of the light lies in at least one of a visible, invisible, or infrared spectral range, or the element comprises, at least in part, a chromium-coated reflecting surface.

3. The display device of claim 1, wherein the lighting means comprises at least one light source, comprising at least one of
    an active or passive light source; or
    a plurality of distributed light sources which are at least one of distributed over a display region or in a matrix.

4. The display device of claim 3, wherein at least one of the at least one light source comprises one or more of groups of emitters or regions with different spectral emission ranges, in which case, for a region that is illuminated by a background light source, the spectral composition of the light emitted from the region is determined at a region that is partially absorbing the light of the background source as a result of the absorption of the partially absorbing region, or
    for a region that is absorbing the light of the background light source, the light emitted from the region can have a spectrum that differs at least in portions from the absorbed light of the background light source by means of re-emission from the region, or that are at least one of operated at one or more of different intensities, polarizations, or different pulse durations, or can emit in different spectral ranges.

5. The display device of claim 1, wherein the display device comprises at least one dark chamber that is separated from the display means in which the moisture detection apparatus for detecting the light reflected by the moisture is housed at least partially.

6. The display device of claim 5, wherein
    the dark chamber comprises at least one filter by which the spectrum of the light that is incident on the moisture detection apparatus can be adjusted,
    the moisture detection apparatus detects only a specific spectrum, a spectrum in an infrared range, or the dark chamber is protected at least partially from the light that is incident from outside by a layer that is not completely transparent at least with respect to the light that incident from the outside.

7. The display device of claim 6, wherein the filter is only partially transparent for at least a portion of the light emitted by the display means, or can transmit the light of at least a first polarization and at least partially reflect or absorb the light of at least a first polarization and light of at least a second polarization that differs substantially from the first polarization, or can attenuate or filter out incident light from the outside.

8. The display device of claim 1, further comprising at least one capacitive sensor element for detecting moisture, wherein the capacitive sensor element comprises at least two electrodes or is formed at least in part by existing components of the display device or the display means.

9. The display device of claim 1, further comprising at least one of a control device or at least one computer unit, wherein at least one of
    the control device is configured to be operatively connected to or to actuate or control at least one device for removing moisture, the at least one device being at least one of a heating device, a cleaning device, a vibration device, the display device, the display means, the moisture detection apparatus, or the capacitive sensor element,
    the at least one of a control device or at least one computer unit is integrated at least partially into the moisture detection apparatus or the display means, or
    the at least one of a control device or at least one computer unit is configured to evaluate data supplied to the control device or the computer unit and forward it to the control device or other devices.

10. A method for operating the display device for detecting moisture of claim 1, comprising
    activating the display means comprising the at least one moisture detection apparatus and the at least one sensor device;

measuring and detecting moisture using the moisture detection apparatus, which at least partially detects the light that is emitted by the display means and reflected by an existing moisture, wherein the step activating of the display means comprises operation of the display means at one or more of different intensities, different polarizations, different pulse durations, or different spectral ranges, wherein the step of measuring is carried out multiple times, wherein the step of detecting moisture comprises analysis of different emissions and detections, for the purpose of distinguishing different forms of moisture or of improving the detection of moisture, and wherein at least one of
during the step of detecting moisture, a value that was measured or further processed during the step of measurement is compared to a reference value that is established by a manufacturer, calibrated after manufacturing, or generated by other means, or
after the step of detecting moisture, a heating device, a means for removing moisture, or a warning function is activated.

11. The method of claim 10, wherein the step of measurement comprises:
measuring a first signal for a sum of outside light and a light reflected by the moisture at a first time point;
measuring a second signal only for the outside light at a second time point, the display means not emitting any light; and
finding a difference between two signals, where a contribution of the outside light is subtracted, and a result is a differential signal that is based on a reflected light reflected by the moisture without an influence of outside light.

12. The method of claim 11, wherein the step of moisture detection comprises the detection of a type of moisture, the type of moisture being identified as water in the case of a high differential signal and as ice in the case of a correspondingly lower differential signal.

13. An exterior mirror, comprising at least one display device as set forth in claim 1, comprising at least one element that is illuminated by means of the display means and partially transparent at least for light of a certain wavelength in the form of at least one cover and at least one coating, wherein
the cover is at least partially transparent to emitted light of certain wavelengths of a spectrum emitted by the display device and comprises at least one outer surface that is positioned on a side facing away from an interior of the exterior mirror and is exposed to outside influences of environment;
the coating is applied to a side facing away from the outer surface of the cover, whereby the coating can be interrupted or lessened in order to allow light of the display device to be transmitted at least partially; and
the exterior mirror comprises one or more of
at least one heating device comprising one or more of
at least one heating coil;
at least one coating;
at least one heating foil,
at least one cleaning device comprising at least one brush, at least one wiper, or at least one nozzle,
at least one vibrating device, or
at least one sound source.

14. The exterior mirror of claim 13, wherein the element comprises at least one symbol region for displaying a display signal from the display device, at least one EC glass, at least one display, or at least a portion of an EC glass or of a display.

15. The exterior mirror of claim 13, wherein the coating comprises one or more of:
at least one reflective coating,
at least one chromium coating,
at least one coating that is absorbent for at least for a specific spectral range,
at least one antireflection coating,
at least one transmitting coating, or
at least one coating that is electrically conductive and transparent at least for a specific spectral range,
a coating comprising transparent, electrically conductive oxides such as indium-tin oxide, carbon nanotubes, or electrically conductive polymers.

16. The exterior mirror of claim 15, wherein at least a portion of the electrically conductive coating forms at least a portion of at least one capacitive sensor element or functions as a heating device.

17. The exterior mirror of claim 13, further comprising more than one display device, and that the display devices, and light and measurement signals of a plurality of display devices, are operatively connected to one another for detecting moisture.

18. The exterior mirror of claim 13, further comprising at least one capacitive sensor element that is configured to detect moisture by measuring a dielectric constant of a dielectric, comprising at least a portion of the element or the cover or a portion of the outer surface of the element, and moisture that is located on at least a portion of the element,
the capacitive sensor element comprising at least two electrodes or being formed at least in part by existing components, the components of the display device, the display means, or the exterior mirror.

19. The exterior mirror of claim 13, wherein
the exterior mirror comprises at least one control device or at least one computer unit,
the control device is configured to be operatively connected to or to actuate or control at least one device for removing moisture, the at least one device being at least one of a heating device, a cleaning device, a vibration device, the display device, the display means, the moisture detection apparatus, or the capacitive sensor element, and
the computer unit evaluating data supplied to the control device or computer unit and forwarding it to the control device or other devices.

20. A motor vehicle, comprising the display device of claim 1.

21. The display device of claim 1, wherein the moisture detection apparatus is further configured to detect the first portion of the wavelength spectrum absorbed by the moisture.

22. The display device of claim 1, wherein the first portion of the wavelength spectrum and the second portion of the wavelength spectrum are in a non-visible light range.

23. The display device of claim 1, wherein the at least one display means is operable in the normal operation to generate a display signal for at least one of a blind spot assist system, a travel direction indicator, a puddle light, a camera system, a TOF camera system, a status indicator, a battery status indicator, or a logo lamp.

24. A display device for an exterior mirror of a motor vehicle, comprising:
at least one display means comprising at least one lighting means for irradiating at least one element that is at least partially transparent at least for light of a specific wavelength, wherein the at least one lighting means is configured to emit light having a wavelength spectrum comprising a plurality of wavelengths;

at least one filter configured to filter light to a wavelength spectrum in a non-visible light range; and at least one moisture detection apparatus comprising at least one sensor device, the moisture detection apparatus being configured to detect light that is emitted from the at least one display means, and absorbed and partially reflected by moisture present on at least a portion of the at least one element, and filtered by the at least one filter, wherein the moisture absorbs light having a wavelength within a first portion of the wavelength spectrum and reemits light having a wavelength within a second portion of the wavelength spectrum, the second portion differing from the first portion, and wherein the moisture detection apparatus is configured to detect a presence of the moisture based on a difference between the first portion and the second portion of the wavelength spectrum.

25. The display device of claim 24, wherein the at least one filter is configured to set a spectrum of light that is incident on the moisture detection apparatus.

26. The display device of claim 25, wherein the at least one filter is an IR filter.

* * * * *